Feb. 17, 1931.   F. L. WILLIAMS   1,793,280
SHEET METAL PIPE
Filed May 22, 1922   2 Sheets-Sheet 2

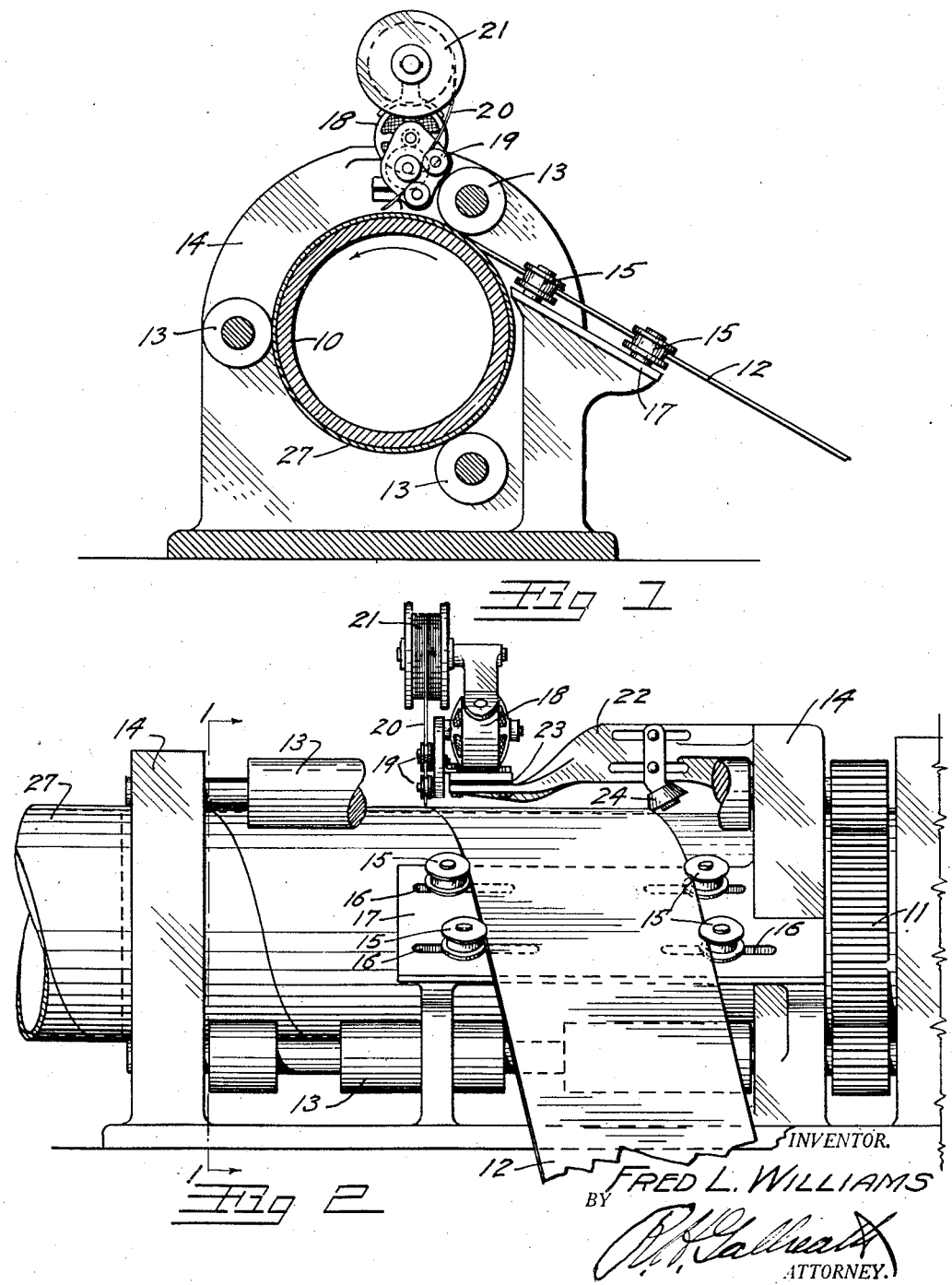

INVENTOR.
FRED L. WILLIAMS
BY
R H Galbreath
ATTORNEY.

Patented Feb. 17, 1931

1,793,280

UNITED STATES PATENT OFFICE

FRED L. WILLIAMS, OF DENVER, COLORADO, ASSIGNOR TO THE AMERICAN ROLLING MILL COMPANY, OF MIDDLETOWN, OHIO, A CORPORATION OF OHIO

SHEET-METAL PIPE

Application filed May 22, 1922. Serial No. 562,701.

This invention relates to pipe and the process for manufacturing same from a continuous strip of sheet metal wrapped in the shape of the spiral of the diameter of the pipe desired and has for its principal object the provision of pipe of this character in which the pipe wall is formed of a single layer of sheet metal, the edges of the sheet being butted together so as to form a smooth unobstructed interior surface.

Another object of the invention is to provide a process for forming spiral sheet metal in which the abutting edges will be securely and continuously welded together as said spiral is formed.

A further object is to provide a process which will be substantially automatic and which will not require the constant attention of the operator.

Other objects and advantages will become apparent from the following description.

The process will now be described in detail, reference being had to the accompanying drawings which form a part hereof. Like numerals refer to like parts throughout the following description and in all views of the drawing.

In the drawings:

Figure 1 is a cross section through a machine such as might be used in this process. The view is taken on the line 1—1, Fig. 2.

Fig. 2 is a side elevation of the same machine partly broken away.

Figure 3:
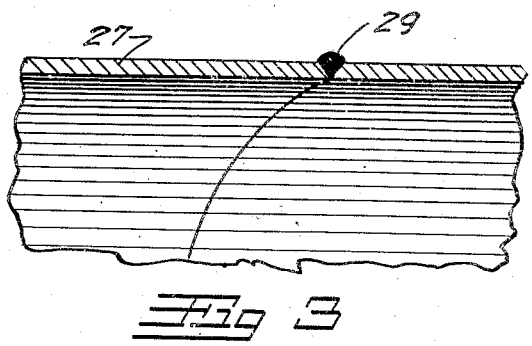
Fig. 3 is a detail sectional view of a joint in the finished pipe.
Figure 4:
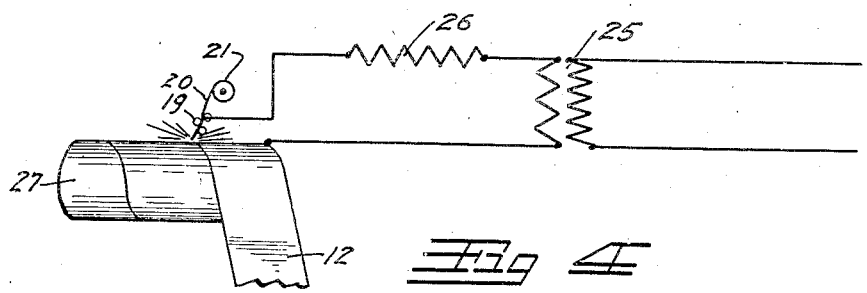
Fig. 4 is a diagram of an electric circuit which may be used in the process.

The construction of a machine which might be used in the process has been outlined on the drawing and in the following description. The machine itself forms no part of this application but will be incorporated in a later application, it being desired only to claim the pipe and the process of making same in the present application Let the numeral 10 designate a mandrel, equal in diameter to the inside diameter of the pipe desired. The mandrel 10 may be rotated by means of a spur gear 11, mounted thereon, or in any other suitable manner.

A strip of sheet metal 12 is fed around the mandrel 10 at an angle to the axis thereof, the angle being determined by the position of a series of guide rollers 15, which are adjustable in slots 16 in an angle plate 17. The adjustment of guide rollers 15 depends upon the diameter of the pipe to be rolled and the width of the strip of sheet metal used. The adjustment should be such that it will cause the edge of the oncoming portion of the strip 12 to abut the edge of the previously rolled portion and so that it will also bring the joint in the proper position for welding as will be later described.

Positioned above the mandrel 10, is a motor 18 which drives a series of rollers 19, adapted to force a strip of welding metal 20 downward toward the mandrel 10. The welding metal 20 feeds from a reel 21, positioned above the motor 18. The motor 18 is supported from the frame 14 by means of a bracket arm 22, from which it is electrically insulated by means of the insulation 23.

An adjustable roller 24 is mounted in slots in the bracket arm 22 and rides upon the edge of the incoming strip 12. The roller 24 is so adjusted as to keep the first joint of the pipe constantly under the point of the welding metal 20. Roller 24 also tends to constantly force the finished pipe 27 off the end of the mandrel 10.

An electric current is caused to flow from a transformer 25, or other source, through a suitable resistance 26 to the welding metal 20, thence arcing across to the pipe 27 and fusing the welding metal and the two abutting edges together. From the pipe 27 the current returns through the frame of the machine to its source 25.

The motor 18 is so adjusted as to supply the welding metal 20 at the proper speed to maintain the arc upon the constantly moving abutting edges.

Figure 5:
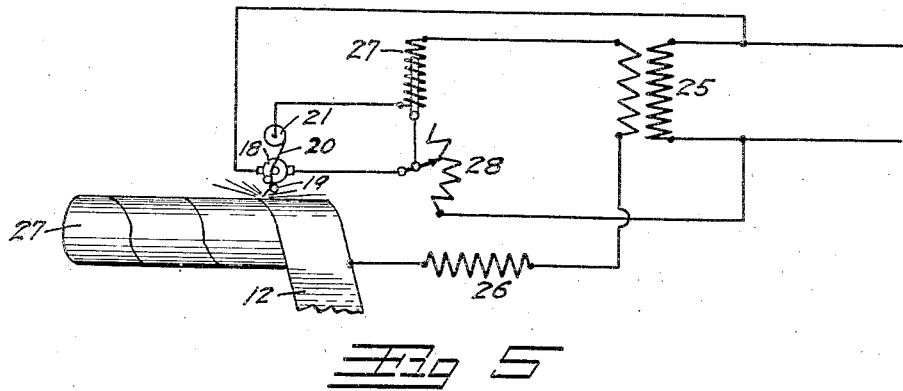
Fig. 5 is a diagram of the circuit used when it is desired to have the machine operate automatically.

In Fig. 5 is shown a method for automatically controlling the arc. An electro-magnet 30 is introduced in series with the arc circuit. The armature of the electro-magnet 30 controls a variable resistance 28 in the power circuit of the motor 18, so that should the arcing distance be widened for any reason or should the arc be extinguished, the electro-magnet 30 will speed up the motor 18 and bring the arc to its proper spacing.

With this system the process is practically automatic. The machine being properly adjusted and started it will operate without attention as long as supplied with sheet metal, welding metal and electricity.

It is desired to call attention to the joint formed by this process, which is shown in detail in Fig. 3. In this view the portion of the metal which has been in a state of fusion is shown in solid black. It will be noted that the interior of the pipe is perfectly smooth at the joint so as to offer no resistance to flow through it. The outer surface contains a small bead 29, which runs spirally around the pipe at the joint. The bead 29 is caused by the addition of the welding metal 20 to the metal of the pipe. Bead 29, because of its spiral position, acts as a reinforcement to the entire length of pipe. The joint of the pipe is its strongest part.

With this process there is no over-lapping at the joint to obstruct the flow and, since the sheet metal is heated only at its extreme edge, there is no objectionable expansion or contraction to cause buckling or distortion. The pipe is formed at a continuous speed.

The term "sheet metal" as used herein is not in any way to be construed as limiting the thickness or gauge of the metal. The invention is equally applicable to the heavy gauge material usually referred to as "plates" and having a thickness of ¼ inch or more.

The term "initial contact point" as employed in the accompanying claims refers to the point or location where the edge of the incoming strip 12 initially contacts with the edge of the spiral previously rolled. This "initial contact point" will continuously and uniformly advance along the spiral as it is formed, yet its location, with reference to the machine, will remain constant. The welding metal 20 preferably, but not necessarily is positioned substantially over this "initial contact point" so that the abutting edges will be continuously welded together as they come together in the spiral and they cannot again become separated.

While a specific form of the invention has been described and illustrated herein, it is desired to be understood that the same may be varied, within the scope of the appended claims, without departing from the spirit of the invention.

Having thus described the invention, what is claimed and desired to be secured by Letters Patent is:—

Pipe consisting of a closed spiral of a single continuous strip of sheet metal, the abutting edges being in alignment and secured together by a continuous butt-weld, said weld projecting above the pipe surface on the outside forming a spiral bead around the pipe throughout its length, the inner surface being substantially continuous and smooth.

In testimony whereof I affix my signature.

FRED L. WILLIAMS.